United States Patent
Qiu et al.

(10) Patent No.: US 11,504,921 B2
(45) Date of Patent: Nov. 22, 2022

(54) HEAT FUSING DEVICES, SMART TRASH RECEPTACLE AND METHODS FOR CONTROLLING HEAT FUSING TEMPERATURE

(71) Applicant: SHANGHAI TOWNEW INTELLIGENT TECHNOLOGY CO., LTD., Shanghai (CN)

(72) Inventors: Beijing Qiu, Shanghai (CN); Le Li, Shanghai (CN); Jianxiang Li, Shanghai (CN)

(73) Assignee: SHANGHAI TOWNEW INTELLIGENT TECHNOLOGY CO., LTD., Shanghai (CN)

( * ) Notice: Subject to any disclaimer, the term of this patent is extended or adjusted under 35 U.S.C. 154(b) by 1022 days.

(21) Appl. No.: 16/210,851

(22) Filed: Dec. 5, 2018

(65) Prior Publication Data
US 2019/0381747 A1   Dec. 19, 2019

(30) Foreign Application Priority Data

Jun. 16, 2018 (CN) .......................... 201810623552.6
Jun. 16, 2018 (CN) ........................ 201810624090.X

(51) Int. Cl.
*B29C 65/00* (2006.01)
*H05B 6/14* (2006.01)
(Continued)

(52) U.S. Cl.
CPC ......... *B29C 66/43121* (2013.01); *H05B 6/14* (2013.01); *B29C 65/30* (2013.01);
(Continued)

(58) Field of Classification Search
CPC ........ B29C 66/43121; B29C 66/81419; B29C 66/84; B29C 65/30; H05B 6/14; B29L 2031/7128
See application file for complete search history.

(56) References Cited

U.S. PATENT DOCUMENTS 4,469,545 A * 9/1984 Low ....................... B29C 66/80
219/508
6,719,867 B1 * 4/2004 Mileti ................. B29C 66/1122
493/203
(Continued)

FOREIGN PATENT DOCUMENTS

GB        1026133 A  *  4/1966

*Primary Examiner* — Daniel McNally
(74) *Attorney, Agent, or Firm* — Rabin & Berdo, P.C.

(57) ABSTRACT

The present invention discloses a heat fusing device for a smart trash receptacle, including: a heating wire for fusion-cutting and thermally sealing an open end of a trash bag, the heating wire being connected to a heat-fusing circuit; a base having heat-resistant and insulating properties, the base having a first end surface on which the heating wire is arranged; and a control mechanism communicatively coupled to the heat-fusing circuit for control thereof. The present invention also discloses a smart trash receptacle incorporating the heat fusing device and a method for controlling a heat fusing temperature. With the present invention, during automatic bagging by the smart trash receptacle, good contact between the heating wire and the trash bag can be ensured while preventing adhesion of the trash bag. This results in improved sealing quality and enables the fulfillment of two tasks, i.e., thermoplastic sealing and thermal fusion-cutting, in the same action of the heat fusing device. As a result, higher automatic bagging quality and reliability are obtainable at lower bagging con- (Continued)

trol difficulty and reduced bagging cost. Moreover, control in the system is simplified, and the stability and reliability of the system are increased.

10 Claims, 5 Drawing Sheets

(51) Int. Cl.
 *B29C 65/30* (2006.01)
 *B29L 31/00* (2006.01)
 *B65F 1/06* (2006.01)
 *B65F 1/14* (2006.01)

(52) U.S. Cl.
 CPC ........ *B29C 66/81419* (2013.01); *B29C 66/84* (2013.01); *B29L 2031/7128* (2013.01); *B65F 1/06* (2013.01); *B65F 1/1405* (2013.01)

(56) References Cited

U.S. PATENT DOCUMENTS

| | | | | |
|---|---|---|---|---|
| 2002/0139084 | A1* | 10/2002 | Tobolka | B29C 65/228 53/374.8 |
| 2009/0319011 | A1* | 12/2009 | Rosiello | A61M 5/44 219/494 |
| 2011/0167772 | A1* | 7/2011 | Piucci, Jr. | B29C 66/81821 53/329.2 |

* cited by examiner

HEAT FUSING DEVICES, SMART TRASH RECEPTACLE AND METHODS FOR CONTROLLING HEAT FUSING TEMPERATURE

TECHNICAL FIELD

The present application relates to the field of smart trash receptacles and, in particular, to heat fusing devices, a smart trash receptacle and methods for controlling a heat fusing temperature.

BACKGROUND

With the advancement of science and technology and the improvement of people's living standards, smart homes are increasingly becoming an indispensable part of our lives. At present, smart trash receptacles have been a focus of people's attention thanks to their characteristics of cleanliness, sanitariness and convenience of use.

A conventional smart trash receptacle usually has a flip cover and an infrared (IR) sensing device arranged in the vicinity thereof. The IR sensing device can cause the flip cover to be opened when sensing an approaching user and closed after the user has left. Although this can save the step for manually opening/closing the flip cover, such a simple function lags far behind users' expectations. Therefore, research efforts in the art have been placed on developing the capabilities including intelligent sensing, automatic bagging and automatic bag replacement. At present, none of known smart trash receptacles available in the marketplace are capable of fully-automatic trash bagging, and most of them do not have a bagging device at all or only have a semi-automatic bagging device. Moreover, most of such semi-automatic bagging devices utilize sealing tapes for bagging, which are far from satisfactory either in operability or in sealing quality. Currently, plastic bags are usually sealed by thermoplastic sealing means typically having an elongated shape. Although such means can be well used to seal thick plastic bags in applications without spatial constraints, they will be grossly disadvantageous when intact incorporated in smart trash receptacles with limited spaces, because their bulky and structurally complex nature will shrink the receptacles' effective internal spaces and degrade their structural stability, functional reliability and user experience.

Therefore, how to address the issue that conventional smart trash receptacles are incapable of automatically trash bagging in a simple and reliable way, how to improve automatic bagging quality and reliability, how to reduce the difficulty of bagging control and bagging cost and how to simplify associated control systems and increase their stability and reliability remain critical technical problems sought to be solved by those skilled in the art.

SUMMARY

It is an object of the present invention to provide heat fusing devices for a smart trash receptacle, a smart trash receptacle and methods for controlling a heat fusing temperature. The device can fulfill two tasks within a single action, i.e., thermoplastic sealing and thermal fusion-cutting of a trash bag in the trash receptacle, thus effectively addressing the issue that conventional smart trash receptacles are incapable of automatically bagging trash in a simple and reliable way, improving automatic bagging quality and reliability, reducing the difficulty of bagging control and bagging cost, enabling simplified control in the system and increasing stability and reliability of the system.

In a first aspect of the present invention, there is provided a heat fusing device for a smart trash receptacle, comprising:

a heating wire (44) for fusion-cutting and thermally sealing an open end of a trash bag, the heating wire (44) being connected to a heat-fusing circuit;

a base (41) having heat-resistant and insulating properties, the base (41) having a first end surface on which the heating wire (44) is arranged; and a control module communicatively coupled to the heat-fusing circuit for control thereof.

According to a preferred embodiment, an anti-adhesion coating may be provided over the first end surface of the base.

According to the present invention, the heating wire may have bent portions at both ends, which are inserted through respective corresponding through-holes or slots in the base and connected to the heat-fusing circuit by a cable harness.

Preferably, the bent portions of the heating wire may be connected to the cable harness by means of cold-crimp terminals.

According to another preferred embodiment, a second end surface of the base, which opposes the first end surface thereof, may define a cable groove in which the cable harness is received.

In a second aspect of the present invention, there is provided another heat fusing device for a smart trash receptacle, comprising:

a heating wire for fusion-cutting and thermally sealing an open end of a trash bag, the heating wire being connected to a heat-fusing circuit;

a base having heat-resistant and insulating properties, the base having a first end surface on which the heating wire is arranged;

a sensor for sensing a temperature of the heating wire; and a control mechanism for controlling the heat-fusing circuit, wherein the sensor is communicatively coupled to the control mechanism, and wherein the control mechanism is connected to the heating wire and configured to control the temperature of the heating wire based on a value sensed by the sensor.

According to a preferred embodiment, the heat fusing device may further comprise a support plate disposed between the base and the heating wire, the support plate having a flat surface on which the heating wire is supported.

According to the present invention, the heating wire may have bent portions at both ends, which are inserted through respective corresponding through-holes or slots in the support plate and connected to the heat-fusing circuit by a cable harness.

Preferably, the bent portions of the heating wire may be connected to the cable harness by means of cold-crimp terminals.

According to another preferred embodiment, the base may be provided, on its first end surface, with at least one set of stop blocks corresponding to at least one set of notches formed in edges of the support plate, each of the notches penetrating through the support plate in a thickness-wise direction thereof, wherein the distances between the stop blocks go with the distances between the notches, and wherein the first end surface of the base is bonded to the support plate with an adhesive tape.

Preferably, a second end surface of the base, which opposes the first end surface thereof, may define a cable groove in which the cable harness is received.

In a third aspect of the present invention, there is provided a smart trash receptacle including the heat fusing device as defined in any one of the above paragraphs.

In a fourth aspect of the present invention, there is provided a method for controlling a heat fusing temperature in the smart trash receptacle as defined above, the method comprising:

controlling the heat-fusing circuit to output power at a first predetermined power level;

obtaining a time duration for which the heat-fusing circuit outputs power at the first predetermined power level;

determining whether the time duration is within a predetermined time duration range; and if not, controlling the heat-fusing circuit to output power at a second predetermined power level.

Preferably, the method may further comprise:

detecting how much an open end of a trash bag is gathered; and if the open end of the trash bag has been gathered, controlling the heat-fusing circuit to output power at the first predetermined power level.

In a fifth aspect of the present invention, there is provided another method for controlling a heat fusing temperature in the smart trash receptacle as defined above, the method comprising:

collecting an actual temperature of the heating wire;

comparing the actual temperature with a predetermined temperature value;

if the actual temperature is higher than the predetermined temperature value, performing a control process to lower the temperature of the heating wire; and if the actual temperature is lower than the predetermined temperature value, performing a control process to raise the temperature of the heating wire.

Preferably, the method further comprises:

calculating a deviation of the actual temperature from the predetermined temperature value;

comparing the deviation with a predetermined deviation range;

if the deviation is within the deviation range, calculating a control amount using a proportional-integral-derivative algorithm;

if the deviation is beyond the deviation range, calculating a control amount using a proportional-derivative algorithm; and adjusting the temperature of the heating wire based on the control amount.

The technical solution provided by the present invention offers the following beneficial effects:

During an automatic bagging process by the smart trash receptacle, the heat fusing device having the heat-resistant insulating base and the heating wire fastened to the base can fulfill two tasks in a single action, i.e., thermoplastic sealing and thermal fusion cutting, while ensuring good contact between the heating wire and the trash bag and preventing adhesion of the trash bag. This results in improved sealing quality as well as structural simplicity and reliability. Thus, the issue that the various conventional trash receptacles do not have effective means for automatic bagging and sealing is addressed, and high automatic bagging quality and reliability can be obtained at lower bagging control difficulty and reduced bagging cost. Moreover, control in the system is simplified, and the stability and reliability of the system are increased.

Further, the base for supporting the heating wire is entirely made of a ceramic material, and an anti-adhesion coating is provided on the surface of the base that is in contact with the heating wire. Since ceramics have the properties of high temperature resistance, corrosion resistance, a long service life and good surface smoothness, and by virtue of the presence of the anti-adhesion coating, when the heating wire comes into contact with the trash bag for its heat fusion, the trash bag will barely adhere to the heat fusing device, thereby ensuring its good performance. Moreover, as ceramics are excellent in electrical insulation and heat resistance, the base can be prevented from experiencing deformation or damage at a high temperature of the heating wire, thus helping in avoiding current leakage in the device.

Figure 1:
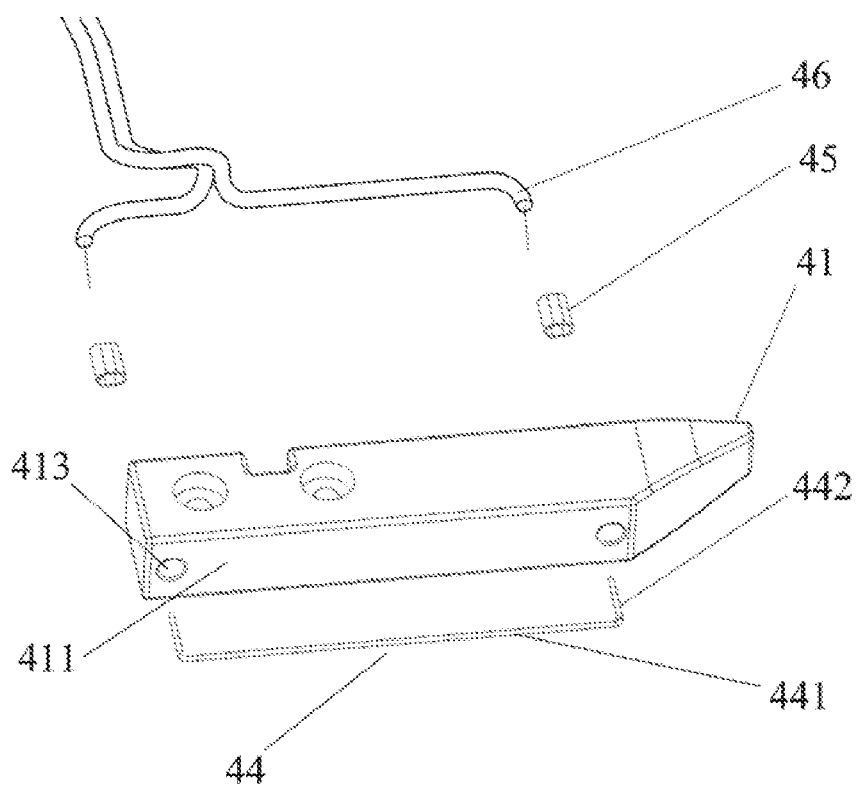
FIG. 1 is an exploded schematic view of a heat fusing device according to a first embodiment of the present invention.
Figure 2:
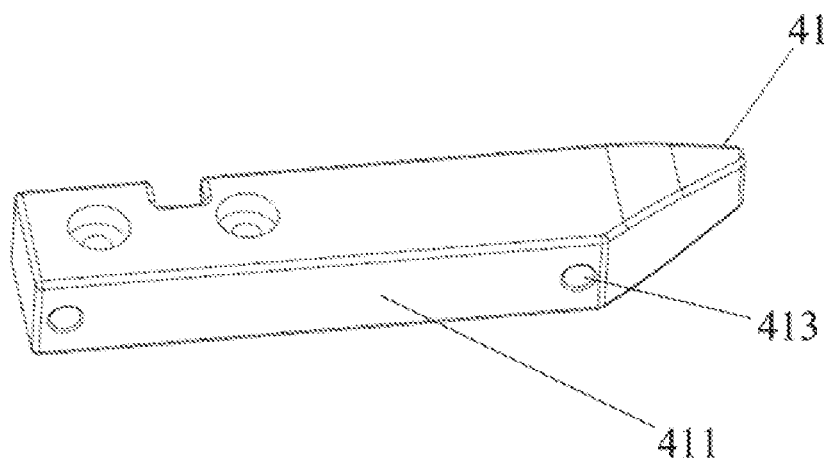
FIG. 2 shows a front axial side of a base of the heat fusing device according to the first embodiment of the present invention.
Figure 3:
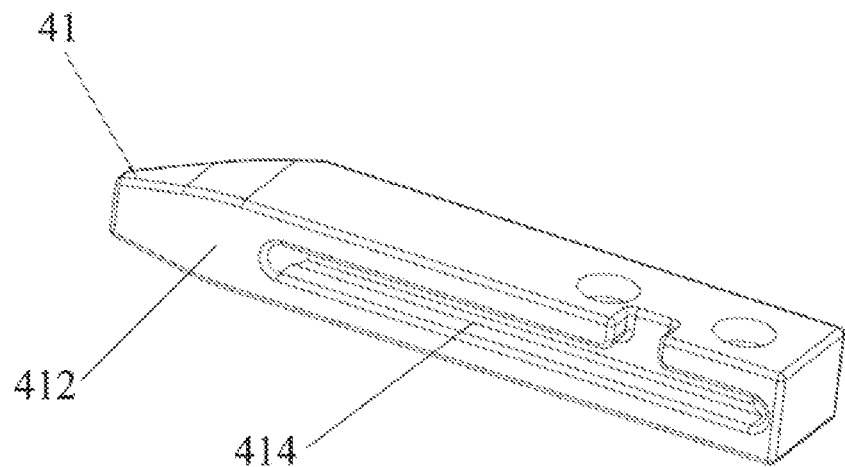
FIG. 3 shows a rear axial side of the base of the heat fusing device according to the first embodiment of the present invention.

In these figures, 1 denotes a body of a trash receptacle; 2, a first pressing bar; 3, a second pressing bar; 4, a heat fusing device; 5, a first fixed bar; 6, a second fixed bar; 7, a guide slot; 8, a main cover section; 9, driving means; 10, a baseplate; 11, a synchronous belt assembly; 12, an arcuate chamfer; 41, a base; 44, a heating wire; 45, a cable clip; 46, a cable harness; 411, a first end surface of the base; 412, a second end surface of the base; 413, a hole in the base; 414, a cable groove; 415, a notch; 441, a heat fusing portion of the heating wire; 442, a bent portion of the heating wire; and 431, a hole in a ceramic plate.

DETAILED DESCRIPTION

Exemplary embodiments will be described in detail below, examples of which are illustrated in the accompanying drawings. Whenever mentioned in the following description, the same numbers in different figures represent the same or similar elements, unless otherwise stated. The implementations set forth in the following description of exemplary embodiments do not represent all implementations consistent with the claimed invention. Instead, they are merely some examples of devices and methods consistent with certain aspects of the invention as specified in the appended claims.

Embodiments will be described below with reference to the accompanying drawings. In addition, the embodiments set forth below do not limit the invention as defined by the appended claims in any sense. Further, none of the features described in the following embodiments are considered necessarily essential to the subject matter of the claims attached.

Embodiment 1

Reference is made to FIGS. 1 to 4, in which a heat fusing device for a smart trash receptacle according to a first embodiment of the present invention is shown. The heat fusing device includes:

a heating wire 44 for fusion-cutting and thermally sealing an open end of a trash bag, the heating wire 44 being connected to a heat-fusing circuit;

a base 41 having heat-resistant and insulating properties, the base 41 having a first end surface on which the heating wire 44 is arranged; and a control module communicatively coupled to the heat-fusing circuit for control thereof.

The base 41 is fixed to a body of the trash receptacle 1, and its first end surface 411 provides accommodation for the heating wire 44. Under the action of the heat-fusing circuit, the temperature of the heating wire 44 can be raised to a melting point of the trash bag so that the latter can be fusion-cut and sealed. Moreover, as the base 41 is heat-resistant and insulating, it will not be deformed or damaged at a high temperature of the heating wire 44 and helps in preventing current leakage in the device.

In this embodiment, the base 41 is preferably made of a ceramic material. As such, the base may have a smooth ceramic surface which is dense in texture and not permeable so that dust or dirt will not easily adhere thereto. Additionally, the ceramic surface can be conveniently cleaned with a solvent, without suffering from any adverse effect on the material properties. Moreover, as the ceramic material has good electrical and thermal insulation properties, the base 41 will not be deformed or damaged at a high temperature of the heating wire 44 and helps in preventing current leakage in the device. Further, it can avoid adhesion of, and hence damage to, the trash bag and accumulation of dirt in the heat fusing device, leading to improved automatic bagging quality and enhanced stability and reliability of the smart trash receptacle. Of course, the material of the base 41 is not limited to the ceramic material and may also be another heat-resistant insulating material or another material that has undergone heat resistance and insulation treatments.

Further, an anti-adhesion coating may be provided on the first end surface 411 of the base 41. As such, upon the heating wire 44 coming into contact with the trash bag for heat fusion, the trash bag will barely adhere to the heat fusing device, thus ensuring its good performance.

In this embodiment, the heating wire 44 may have bent portions 442 at both ends, and the ceramic base 41 may define through-holes 413 corresponding to the respective bent portions 442. It will be readily appreciated that slots may be defined instead of the through-holes 413. The bent portions 442 can be inserted through the through-holes or slots 413 and connected to the heat-fusing circuit by a cable harness 46. In other words, the heating wire 44 has a heat fusing portion 441 and bent portions 442. The bent portions 442 are connected to the heat-fusing circuit, while the heat fusing portion 441 is configured to be brought into contact with the trash bag to fusion-cut and seal it. As such, since the bent portions 442 of the heating wire 44 are inserted through the through-holes or slots 413 and connected by the cable harness 46, the connection of the heating wire 44 is firm. Moreover, as the heat fusing portion 441 of the heating wire 44 entirely rests on the anti-adhesion coating of the base 41, adhesion of the trash bag can be effectively prevented.

Further, the bent portions 442 of the heating wire 44 may be fastened to the base 41 by means of cold-crimp terminals 45. Each of the cold-crimp terminals 45 may have an opening allowing the passage of a wire therethrough and an adjusting member for adjusting the size of the opening. During use, the bent portions 442 are inserted into the openings, and the adjusting members are then manipulated to narrow the openings, so that the bent portions 442 are fastened to the base 41 together with the cold-crimp terminals 45. As the cold-crimp terminals 45 are simple in structure, easy to use and inexpensive, they can help in saving labor for assembly and manufacturing cost.

In this embodiment, the control module in the heat fusing device may control the heat-fusing circuit based on program settings and timing outputs of a timer, thereby controlling heating power of the heating wire 44 to such a level that ensures the trash bag to be always heat-fused at the temperature of the heating wire 44. This allows the temperature of the heating wire 44 to be easily adjusted, ensures good automatic bagging quality, improves the utility and reliability of the smart trash receptacle and leads to a further reduction in bagging and assembly costs.

Further, the base 41 has the first end surface 411 and a second end surface 412 opposing the first end surface 411. That is, the first end surface 411 and the second end surface 412 are on opposing sides. The second end surface 412 of the base 41 defines a cable groove 414 in which the cable harness 46 is received. Hiding the cable harness 46 in the cable groove 414 can provide protection to the circuit, facilitate the assembly of the heat fusing device and enable component modularization.

Figure 4:
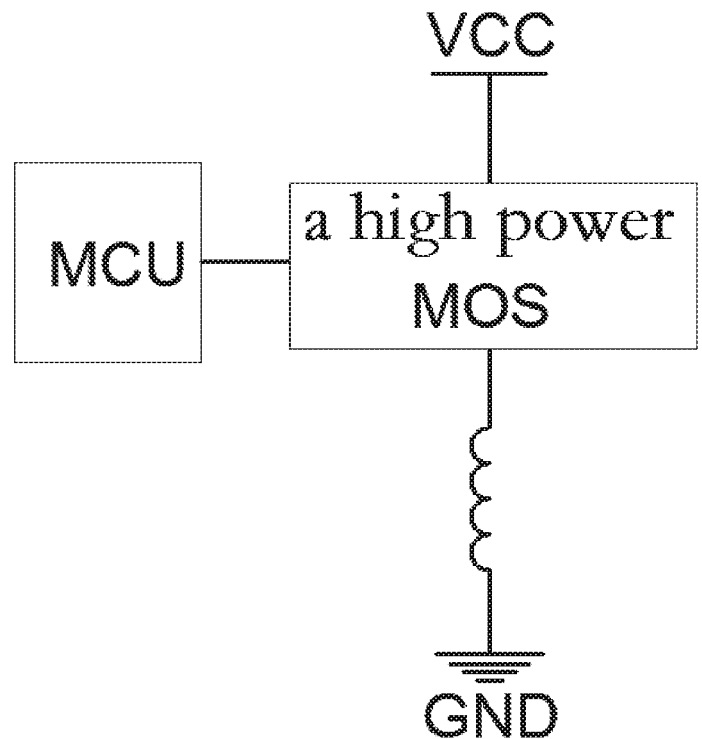
FIG. 4 is a structural schematic illustrating how the heat fusing device according to the first embodiment of the present invention is controlled.

In some preferred implementations, the control module includes a microcontroller unit (MCU) which, as shown in FIG. 4, is communicatively coupled to a high power MOS device and adapted to adjust an output power level thereof based on program settings and timing values of a timer, thus enabling the control over the heating wire 44. The MOS device is also known as a MOS transistor or a metal-oxide-semiconductor field-effect transistor (MOSFET).

In this particular embodiment, there is also provided a smart trash receptacle incorporating the heat fusing device as defined above. In doing so, during an automatic bagging process of the smart trash receptacle, the heating fusing device is not only capable of ensuring good contact between the heating wire 44 and the trash bag, but can also prevent adhesion of the trash bag, thus addressing the issues of easy damage to the trash bag and accumulation of dirt in the heat fusing device, improving automatic bagging quality and enhancing the stability and reliability of the smart trash receptacle. Since the smart trash receptacle offers the substantially same beneficial effects as the above-described heat fusing device, it will not be described in further detail herein for the sake of simplicity.

It will be appreciated that the smart trash receptacle may have a movable baseplate which can slowly approach and abut against the heating wire 44. During the approach of the baseplate, the trash bag will be plastically sealed gradually by heat from the heating wire 44. Upon the baseplate abutting against the heating wire 44, the plastically sealed trash bag is fusion-cut by the heating wire 44. In this way, both thermoplastic sealing and thermal fusion-cutting can be accomplished within a single action, thus simplifying the heat fusing structure and reducing its footprint.

As a result, during an automatic bagging process performed by the smart trash receptacle, the heat fusing device is capable of fulfilling two tasks within a single action, i.e., thermoplastic sealing and thermal fusion-cutting. This allows structural simplicity and reliability, solves the problem that the existing trash receptacles of various types do not have effective means for automatic bagging and sealing, improves automatic bagging quality and increases the degree of intelligence of the smart trash receptacle.

Figure 5:
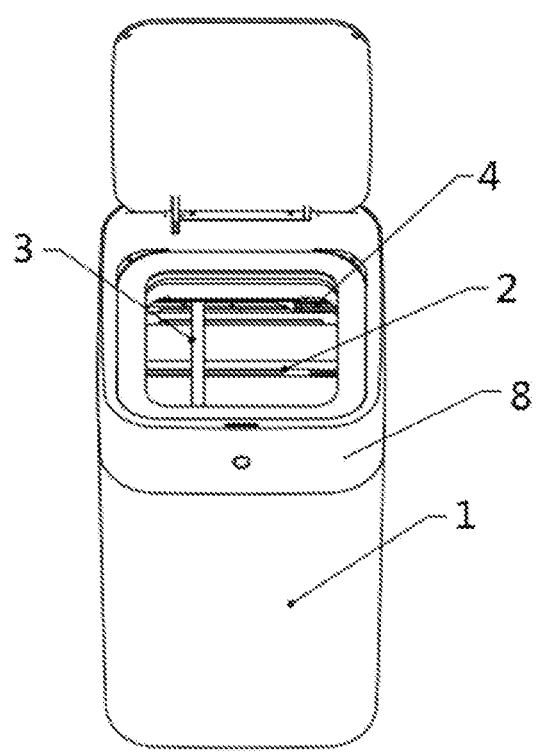
FIG. 5 is a structural schematic of a smart trash receptacle according to the first embodiment of the present invention.
Figure 6:
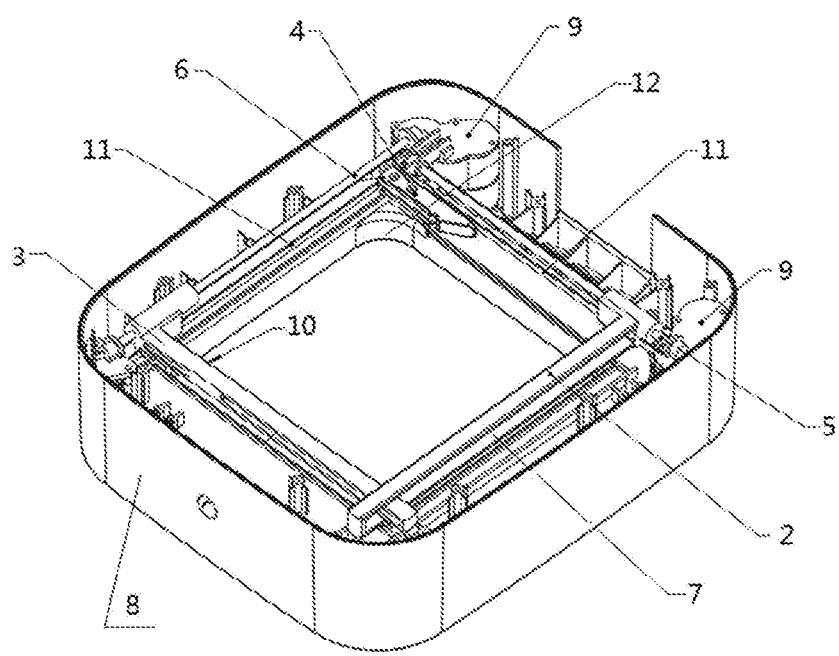
FIG. 6 is a structural schematic illustrating the positions of the heat fusing device and a trash bagging mechanism according to the first embodiment of the present invention.
Figure 7:
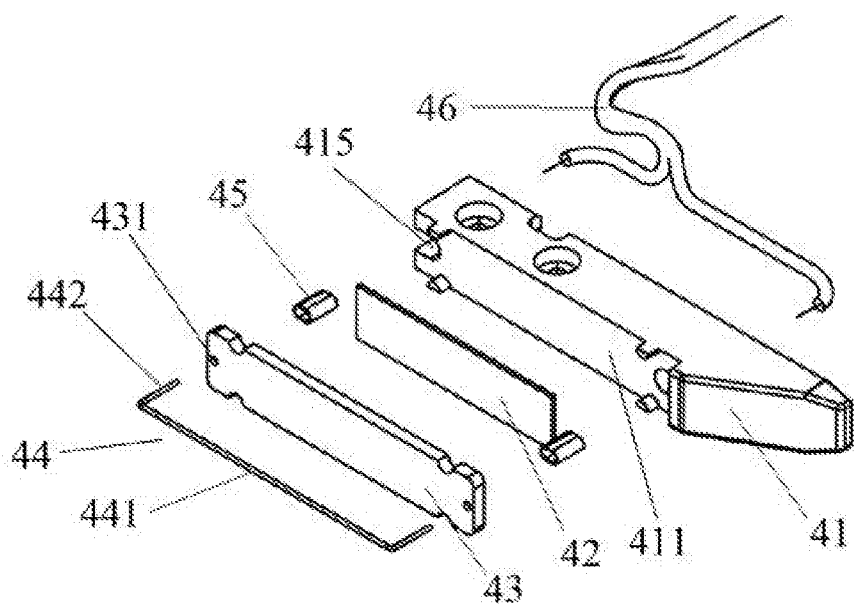
FIG. 7 is an exposed schematic view of a heat fusing device according to a second embodiment of the present invention.
Figure 8:
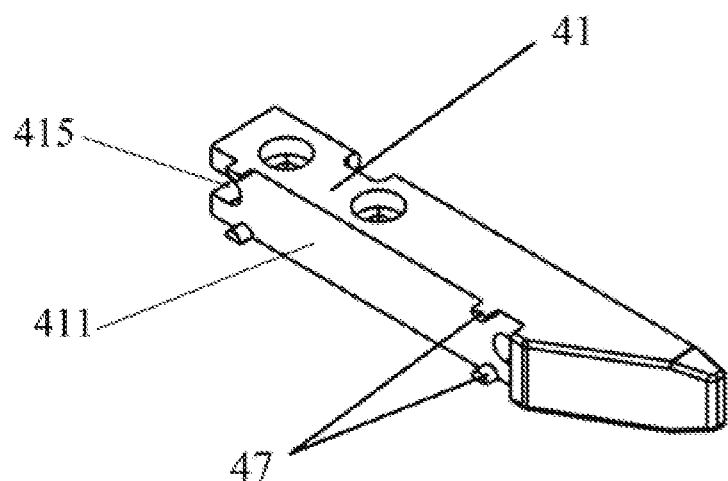
FIG. 8 shows a front axial side of a base of the heat fusing device according to the second embodiment of the present invention.
Figure 9:
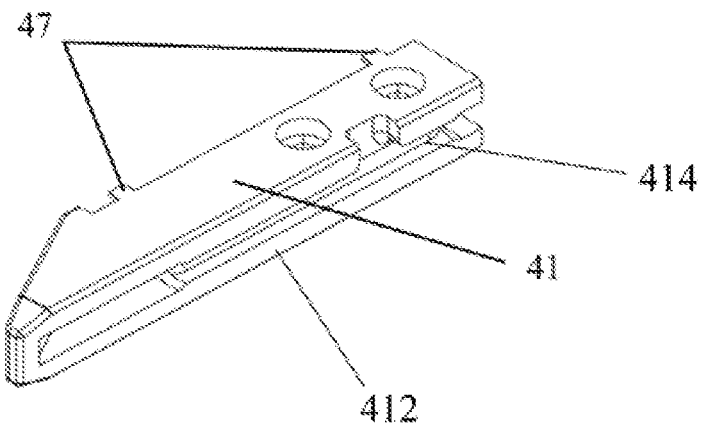
FIG. 9 shows a rear axial side of the base of the heat fusing device according to the second embodiment of the present invention.

In some other implementations, referring to FIG. 5 to 6, the smart trash receptacle includes a trash bagging mechanism that is used to automatically gather and seal an open end of a trash bag full with trash and is disposed within the body of the trash receptacle 1. A first fixed edge and a second fixed edge may be provided at tops of internal surfaces of the body of the trash receptacle 1. The first fixed edge may intersect the second fixed edge. Further, it may be configured that the first and second fixed edges are perpendicular to each other.

The bagging mechanism may include: a first pressing bar 2, which is able to slide along the second fixed edge to gather the open end of the trash bag onto the first fixed edge; and a second pressing bar 3, which is able to slide along the first fixed edge to gather the open end of the trash bag onto the second fixed edge. In addition, the first pressing bar 2 and the second pressing bar 3 can work together to gather the trash bag to the intersection of the first fixed edge and the second fixed edge, in the vicinity of which, the heat fusing device 4 is disposed for sealing and closing the open end of the trash bag. In this way, the open end of the trash bag can be gathered up at one point and can be more easily sealed, and during the heat fusing and sealing by the heat fusing device 4, it is less possible for thermal damage of the bag body and leakage of trash.

Further, it includes driving means 9 for driving the first pressing bar 2 and the second pressing bar 3 to automatically gather the open end of the trash bag without human intervention, promoting convenience in our lives.

With the above arrangement, the open end of the trash bag can be gathered in two directions, thus solving the problems of inadequate sealing and proneness to thermal damage at the sealed portion due to a small material thickness there arising from the unidirectional gathering method adopted in automatic bagging mechanisms of conventional smart trash receptacles.

In a preferred implementation of this embodiment, in order to gather the open end of the trash bag in a more concentrated and faster manner, the intersection of the first fixed edge and the second fixed edge may be implemented as an arcuate chamfer 12. In addition, the baseplate 10 may be provided, which may be implemented as an elastic flexible material attached to the lateral side of a second pressing bar 3 corresponding to the heat fusing device 4. As such, the first pressing bar 2 and the second pressing bar 3 are able to gather the open end of the trash bag between the baseplate 10 and the heat fusing device 4, thus providing a buffer for the gathering of the trash bag and ensuring denser gathering.

Specifically, the baseplate 10 may be composed of the elastic flexible material and a Teflon tape bonded to the surface thereof. Using this tape allows convenient and fast attachment to the lateral side of the second pressing bar 3.

In this embodiment, the body of the trash receptacle 1 may include a receptacle section and a main cover section 8 residing on the receptacle section. The first pressing bar 2, the second pressing bar 3, a first fixed bar 5, a second fixed bar 6, the driving means 9 and the heat fusing device 4 may be all housed within the main cover section 8. Preferably, the first fixed bar 5, the second fixed bar 6, the first pressing bar 2 and the second pressing bar 3 may be disposed on the respective four side walls of the main cover section 8 of the trash receptacle.

It should be noted that the first fixed bar 5 and the second fixed bar 6 perpendicular to the first fixed bar 5 may be fixedly disposed in the main cover section 8, with a lateral edge of the first fixed bar 5 forming the first fixed edge and a lateral edge of the second fixed bar 6 forming the second fixed edge. The second pressing bar 3 may be disposed parallel to the first fixed bar 5, and the first pressing bar 2 to the second fixed bar 6. Guide means may be provided respectively between the first pressing bar 2 and the first fixed bar 5, between the first pressing bar 2 and the second pressing bar 3, between the second pressing bar 3 and the second fixed bar 6 and between the second pressing bar 3 and the first pressing bar 2. Under the guidance of such guide means, the first pressing bar 2 and the second pressing bar 3 can gather the open end of the trash bag to the intersection of the first fixed edge and the second fixed edge.

The first pressing bar 2 may first transversely gather the open end of the trash bag under the guidance of the guide means, and the second pressing bar 3 may then longitudinally gather it under the guidance of the guide means. In this way, the open end of the trash bag may be gathered in the two directions to one point and hence more easily sealed.

In one implementation, the first pressing bar 2 may define a guide slot 7, which extends axially with respect thereto, and through which one end of the second pressing bar 3 is inserted. The first pressing bar 2 may further define, at its one end, a first guide hole for the passage of the first fixed bar 5 therethrough. The first pressing bar 2 is able to reciprocate axially with respect to the first fixed bar 5 and the second pressing bar 3. The second pressing bar 3 may further define, at its one end, a second guide hole for the passage of the second fixed bar 6 therethrough, and the second pressing bar 3 is able to reciprocate axially with respect to the second fixed bar 6 and the first pressing bar 2.

Preferably, in order to prevent the second pressing bar 3 from sliding out of the guide slot 7, the guide slot 7 may be closed at the ends.

In this embodiment, the driving means 9 may include a motor, a gear assembly and a synchronous belt assembly 11. The motor may be drivingly connected to the gear assembly so as to be able to drive the latter to rotate. The gear assembly may be engagingly connected to the synchronous belt assembly 11, and the first pressing bar 2 and the second pressing bar 3 may be both fastened to the synchronous belt assembly 11. As such, the synchronous belt assembly 11 can drive the first pressing bar 2 and the second pressing bar 3 to move, thereby enabling automatic gathering of the trash bag.

In this particular embodiment, there is also provided a method for controlling a heat fusing temperature for the smart trash receptacle as defined above. The method includes:

controlling the heat-fusing circuit to output power at a first predetermined power level;

obtaining a time duration for which the heat-fusing circuit outputs power at the first predetermined power level;

determining whether the time duration is within a predetermined time duration range; and if not, controlling the heat-fusing circuit to output power at a second predetermined power level;

The method may further include, before the heat-fusing circuit is controlled to output power at the first predetermined power level:

detecting how much an open end of a trash bag is gathered; and if the open end of the trash bag has been gathered, controlling the heat-fusing circuit to output power at the first predetermined power level.

In order for the method to be implementable, the control module may have a timer or timing program for time sampling, a comparator for comparing time values with pre-programmed values, the first predetermined power level, the second predetermined power value and the predetermined time duration range.

It should be noted that, affected both by heating power and heat dissipation, the temperature of the heating wire 44 will reach a certain equilibrium. Therefore, on the basis of extensive experiments and validations, a temperature equilibrium curve for the heating wire 44 may be plotted as a function of heating power and heating time duration. Additionally, a table of control rules may be stored on the control module, for section-wise heating power control for the heating wire 44 based on its heating power, heating time duration and other parameters. In this way, the temperature of the heating wire may be efficiently controlled within a suitable range in real time at low cost, facilitating the fusion-cutting and sealing of the trash bag. Moreover, the need for a temperature sensor can be dispensed with, helping in structural simplification and cost saving.

In some preferred implementations, a target value for temperature control of the heating wire may be 320 degrees, compared to the melting point of the trash bag ranging from 200 degrees to 400 degrees. Therefore, this preset temperature is conducive to the fusion-cutting and sealing of the trash bag.

Embodiment 2

Reference is now made to FIGS. 7 to 10, in which a heat fusing device for a smart trash receptacle according to a second embodiment of the present invention is shown. For the sake of easy understanding, the same components in this embodiment are indicated by the same reference numbers as Embodiment 1.

As shown in the figures, in addition to the base 41 and the heating wire 44, the heat fusing device according to this embodiment also includes a sensor and a control module. The sensor is configured to sense the temperature of the heating wire 44 and is communicatively coupled to the control module. The control module is connected to the heating wire 44 and is adapted to control the temperature of the heating wire 44 based on a value sensed by the sensor. The sensor is preferred to be a temperature sensor either in direct contact with the heating wire 44 or in indirect contact therewith via a thermally-conductive member.

Additionally, a support plate 43 may be disposed between the base 41 and the heating wire 44. The support plate 43 may have a surface on which the heating wire 44 is supported. As described above, the heating wire 44 is adapted to fusion-cut and to plastically seal the open end of the trash bag and is coupled to the heat-fusing circuit. Under the action of the heat-fusing circuit, the temperature of the heating wire 44 can be raised to a melting point of the trash bag so that the latter can be fusion-cut and sealed.

In this embodiment, the support plate is preferably a ceramic plate 43 having a flat surface on which the heating wire 44 is supported so that the heating wire 44 is disposed on the side of the ceramic plate 43 where the flat surface is present. Since the ceramic plate 43 has the properties of high temperature resistance, corrosion resistance, a long service life and good surface smoothness, when the heating wire 44 comes into contact with the trash bag for its heat fusion, the trash bag will rarely adhere to the heat fusing device, thus ensuring its good performance.

It should be noted that the flat surface of the ceramic plate 43 may be a smooth ceramic surface which is dense in texture and not permeable so that dust or dirt cannot easily adhere thereto. Additionally, the ceramic surface can be conveniently cleaned with a solvent, without suffering from any effect on the material properties. Moreover, as the ceramic plate 43 has good electrical and thermal insulation properties, it can prevent the base from experiencing deformation or damage at a high temperature of the heating wire 44 and helps in avoiding current leakage in the device. Further, it can avoid adhesion of, and hence damage to, the trash bag and accumulation of dirt in the heat fusing device, leading to improved automatic bagging quality and enhanced stability and reliability of the smart trash receptacle.

In this embodiment, the heating wire 44 may similarly have bent portions 442 at both ends, and the ceramic plate 43 may define through-holes 431 corresponding to the respective bent portions 442. It will be readily appreciated that slots may be defined instead of the through-holes 431. The bent portions 442 can be inserted through the through-holes or slots 431 and connected to the heat-fusing circuit by a cable harness 46. In other words, the heating wire 44 has a heat fusing portion 441 and bent portions 442. The bent portions 442 are connected to the heat-fusing circuit, while the heat fusing portion is configured to be brought into contact with the trash bag to fusion-cut and plastically seal it. As such, since the bent portions 442 of the heating wire 44 are inserted through the through-holes or slots 431 and fastened to the base 41, the connection of the heating wire 44 is firm. Moreover, as the heat fusing portion of the heating wire 44 entirely rests on the flat surface of the ceramic plate 43, adhesion of the trash bag can be effectively prevented.

With similarity to Embodiment 1, the bent portions 442 of the heating wire 44 may be fastened to the base 41 by means of cold-crimp terminals 45.

The base 41 may define notches 415 in which the cold-crimp terminals 45 can be snugly received. Moreover, when received in the notches 415, the cold-crimp terminals 45 may experience inner-diametrical reductions, thereby locking the bent portions 442 therein. As such, the cold-crimp terminals 45 and the notches 415 constitute space-saving fasteners for the heating wire 44 with improved smoothness and few burrs that may scratch the trash bag.

In some implementations, the base 41 may have a first end surface 411 in contact with the ceramic plate 43 and a second end surface 412 opposing the first end surface 411. An adhesive tape 42 may be provided between the first end surface 411 and the ceramic plate 43 to bond them together. As such, the attachment of the ceramic plate 43 to the base 41 can be accomplished with a simple structure by easy operations. It can save time and labor and help in improving operational efficiency.

In order for more stable connection between the ceramic plate 43 and the base 41 to be achieved, at least one set of stop blocks 47 may be provided on the first end surface 411 of the base 41, and accordingly, at least one set of notches may be formed in edges of the ceramic plate 43. Each set of stop blocks 47 may be in one-to-one correspondence with a respective set of notches so that the distances between the stop blocks 47 go with the distances between the notches. Each of the notches may penetrate through the ceramic plate 43 in a thickness-wise direction thereof. Here, the "thickness-wise direction" refers to a direction pointing from one flat surface of the ceramic plate 43 to the other flat surface thereof. In this way, in order to fasten the ceramic plate 43 to the base 41, each set of stop blocks 47 may be snapped in a corresponding set of notches, making the attachment of the ceramic plate 43 to the first end surface 411 of the base 41 more snug and firm. Preferably, two sets of stop blocks 47 and two sets of notches, i.e., four snap-on fasteners, may be provided to further increase the stability in the attachment of the ceramic plate 43.

Further, the heat fusing device includes the control module communicatively coupled to the temperature sensor for sensing the temperature of the heating wire 44. The control module incorporates the heat-fusing circuit and is coupled to the heating wire 44 via the cable harness 46. During a heat fusion process, the control module may control the temperature of the heating wire 44 based on a value of the temperature of the heating wire 44 sensed by the temperature sensor so as to ensure that the trash bag can be always heat fused at the temperature of the heating wire 44. This is favorable to automatic temperature adjustment for the heating wire 44, ensures good automatic bagging quality and improves the utility and reliability of the smart trash receptacle.

Similarly, the base 41 may have a second end surface 412 defining a cable groove 414 in which the cable harness 46 is accommodated.

Figure 10:
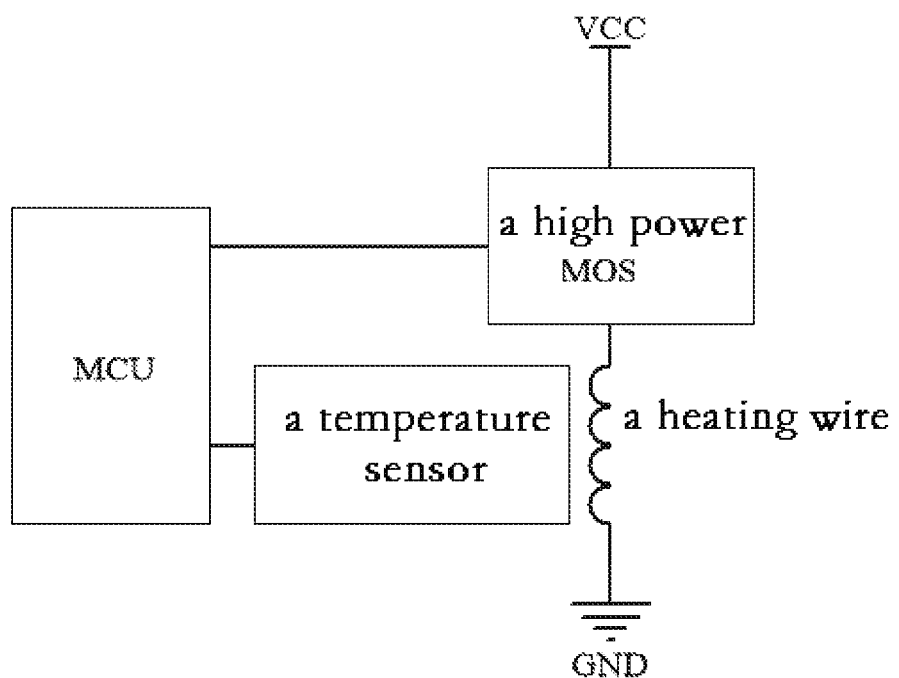
FIG. 10 is a structural schematic illustrating how the heat fusing device according to the second embodiment of the present invention is controlled.

In some preferred implementations, the control module includes a microcontroller unit (MCU) which, as shown in FIG. 10, is communicatively coupled to both the temperature sensor and a high power MOS device and adapted to adjust an output power level of the high power MOS device based on the sensed value of the temperature sensor, thus enabling the control over the heating wire 44. The MOS device is also known as a MOS transistor or a metal-oxide-semiconductor field-effect transistor (MOSFET).

In this particular embodiment, there is also provided a smart trash receptacle incorporating the heat fusing device as defined above. In doing so, during an automatic bagging process, the smart trash receptacle is not only capable of ensuring good contact between the heating wire 44 and the trash bag, but can also prevent adhesion of the trash bag, thus addressing the issues of easy damage to the trash bag and accumulation of dirt in the heat fusing device, improving automatic bagging quality and enhancing the stability and reliability of the smart trash receptacle.

In this particular embodiment, there is also provided a method for controlling a heat fusing temperature for the smart trash receptacle as defined above. The method includes:

collecting an actual temperature of the heating wire;
comparing the actual temperature with a predetermined temperature value;
if the actual temperature is higher than the predetermined temperature value, performing a control process to lower the temperature of the heating wire; and
if the actual temperature is lower than the predetermined temperature value, performing a control process to raise the temperature of the heating wire.

In some implementations, based on the difference between the actual temperature of the heating wire and the predetermined temperature value, a control amount of the heating power of the heating wire 44 may be calculated using either of two algorithms, i.e., two approaches for adjusting the temperature of the heating wire.

Preferably, the method further includes:
calculating a deviation of the actual temperature from the predetermined temperature value;
comparing the deviation with a predetermined deviation range;
if the deviation is within the deviation range, calculating the control amount of the heating power of the heating wire 44 using a proportional-integral-derivative (PID) algorithm;
if the deviation is beyond the deviation range, calculating the control amount of the heating power of the heating wire 44 using a proportional-derivative (PD) algorithm; and
adjusting the temperature of the heating wire (44) based on the control amount.

It should be noted that there may be significant hysteresis in both the collection and control of the heating wire's temperature. For this reason, a table of control rules may be implemented in the control program to carry out the PID or PD algorithm depending on the temperature of the heating wire, its fluctuation profile, output amplitude and other parameters and perform control for the heating power level of the heating wire based on the PID or PD algorithm. In this way, the temperature of the heating wire may be efficiently controlled within a suitable range in real time at low cost, facilitating the accomplishment of both fusion-cutting and sealing of the trash bag within a single action.

In some preferred implementations, a predetermined temperature of the heating wire may be 320 degrees, compared to the melting point of the trash bag ranging from 200 degrees to 400 degrees. Therefore, this predetermined temperature is conducive to simultaneous fusion-cutting and sealing of the trash bag.

The foregoing description merely presents a few particular embodiments of the present invention and does not limit the scope thereof in any sense. Any and all variations or substitutions easily devisable by those familiar with the art in light of the teachings disclosed herein are considered to fall within the scope of the present invention. Accordingly, the scope of the invention shall be as defined in the appended claims.

What is claimed is:

1. A heat fusing device for a smart trash receptacle, comprising:
a heating wire (44) for fusion-cutting and thermally sealing an open end of a trash bag, the heating wire (44) being connected to a heat-fusing circuit;
a base (41) having heat-resistant and insulating properties, the base (41) having a first end surface on which the heating wire (44) is arranged; and
a control mechanism communicatively coupled to the heat-fusing circuit for control thereof;
wherein the heating wire (44) has bent portions at both ends, which are inserted through respective corresponding through-holes or slots in the base (41) and connected to the heat-fusing circuit by a cable harness (46).

2. The heat fusing device of claim 1, wherein an anti-adhesion coating is provided over the first end surface of the base (41).

3. The heat fusing device of claim 1, wherein the bent portions of the heating wire (44) are connected to the cable harness (46) by means of cold-crimp terminals (45).

4. The heat fusing device of claim 1, wherein a second end surface of the base (41), which opposes the first end surface thereof, defines a cable groove in which the cable harness (46) is received.

5. A smart trash receptacle, comprising the heat fusing device of claim 1.

6. A heat fusing device for a smart trash receptacle, comprising:
- a heating wire (44) for fusion-cutting and thermally sealing an open end of a trash bag, the heating wire (44) being connected to a heat-fusing circuit;
- a base (41) having heat-resistant and insulating properties, the base (41) having a first end surface on which the heating wire (44) is arranged;
- a support plate (43) disposed between the base (41) and the heating wire (44), the support plate (43) having a flat surface on which the heating wire (44) is supported;
- a sensor for sensing a temperature of the heating wire (44); and
- a control mechanism for controlling the heat-fusing circuit, wherein the sensor is communicatively coupled to the control mechanism, and wherein the control mechanism is connected to the heating wire (44) and configured to control the temperature of the heating wire (44) based on a value sensed by the sensor;
- wherein the heating wire (44) has bent portions at both ends, which are inserted through respective corresponding through-holes or slots in the support plate (43) and connected to the heat-fusing circuit by a cable harness (46).

7. The heat fusing device of claim 6, wherein the bent portions of the heating wire (44) are connected to the cable harness (46) by means of cold-crimp terminals (45).

8. The heat fusing device of claim 6, wherein the base (41) is provided, on its first end surface, with at least one set of stop blocks (47) corresponding to at least one set of notches formed in edges of the support plate (43), each of the notches penetrating through the support plate (43) in a thickness-wise direction thereof, wherein the distances between the stop blocks (47) go with the distances between the notches, and wherein the first end surface of the base (41) is bonded to the support plate (43) with an adhesive tape (42).

9. The heat fusing device of claim 6, wherein a second end surface of the base (41), which opposes the first end surface thereof, defines a cable groove in which the cable harness (46) is received.

10. A smart trash receptacle, comprising the heat fusing device of claim 6.

\* \* \* \* \*